(12) United States Patent
Kiwaki

(10) Patent No.: US 9,221,304 B2
(45) Date of Patent: Dec. 29, 2015

(54) TIRE

(75) Inventor: Yukihiro Kiwaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 635 days.

(21) Appl. No.: 13/579,773

(22) PCT Filed: Feb. 18, 2011

(86) PCT No.: PCT/JP2011/053492
§ 371 (c)(1),
(2), (4) Date: Sep. 20, 2012

(87) PCT Pub. No.: WO2011/102457
PCT Pub. Date: Aug. 25, 2011

(65) Prior Publication Data
US 2013/0000804 A1    Jan. 3, 2013

(30) Foreign Application Priority Data

Feb. 18, 2010 (JP) ................................. 2010-033574

(51) Int. Cl.
*B60C 11/13* (2006.01)
*B60C 11/03* (2006.01)
(Continued)

(52) U.S. Cl.
CPC ......... *B60C 11/0309* (2013.04); *B60C 11/0306* (2013.04); *B60C 11/125* (2013.04);
(Continued)

(58) Field of Classification Search
CPC .................. B60C 11/03; B60C 11/032; B60C 2011/0341; B60C 2011/0355; B60C 2011/0381; B60C 11/125; B60C 11/13; B60C 2011/133; B60C 11/1353; B60C 11/04; B60C 11/12; B60C 2011/1254; B60C 2011/0344; B60C 2011/0346
USPC ............. 152/209.1, 209.18, 209.25, 900, 901
See application file for complete search history.

(56) References Cited

U.S. PATENT DOCUMENTS 2,260,193 A    10/1941  Overman
2,268,344 A *  12/1941  Shesterkin ............... 152/209.18
(Continued)

FOREIGN PATENT DOCUMENTS

EP         1 661 732 A2    5/2006
JP         08-085308   *   4/1996
(Continued)

OTHER PUBLICATIONS

Extended European Search Report issued in European Application No. 11744743.3 dated Dec. 17, 2013.
(Continued)

*Primary Examiner* — Eric Hug
(74) *Attorney, Agent, or Firm* — Sughrue Mion, PLLC

(57) ABSTRACT

An intra-groove groove 310,330 is formed in circumferential groove 31,33 which is formed in a pneumatic tire 1, the intra-groove groove 310,330 is recessed farther inward in a tire radial direction TR than the circumferential groove 31,33. The intra-groove groove 310,330 includes a high-angle groove section 311,331 in which an angle θ1 formed between a straight line L1 and the intra-groove groove 310,330 is equal to or more than a predetermined angle, and a low-angle groove section 312,332 in which an angle θ2 formed between the straight line L1 and the intra-groove groove 310,330 is smaller than the predetermined angle. The high-angle groove section 311,331 is positioned closer to an intra-groove center line DCL than the low-angle groove section 312,332. A width W1 of the high-angle groove section 311, 331 is wider than a width W2 of the low-angle groove section 312, 332.

5 Claims, 7 Drawing Sheets

(51) Int. Cl.
*B60C 11/04* (2006.01)
*B60C 11/12* (2006.01)

(52) U.S. Cl.
CPC ......... *B60C11/1353* (2013.04); *B60C 11/0302* (2013.04); *B60C 2011/0341* (2013.04); *B60C 2011/0344* (2013.04); *B60C 2011/0348* (2013.04); *B60C 2011/0351* (2013.04); *B60C 2011/0381* (2013.04); *B60C 2011/1254* (2013.04); *B60C 2011/133* (2013.04)

(56) References Cited

U.S. PATENT DOCUMENTS 3,727,661 A * 4/1973 Hoke ..................... 152/209.22
6,003,576 A * 12/1999 Auxerre et al. .......... 152/209.18
6,505,661 B1 * 1/2003 Nakagawa et al. ...... 152/209.15
2006/0130950 A1 6/2006 Murata
2011/0308676 A1 * 12/2011 Morozumi ................ 152/153
2012/0273106 A1 * 11/2012 Kiwaki et al. ........... 152/209.18

FOREIGN PATENT DOCUMENTS

| JP | 2001-191736 A | 7/2001 |
| JP | 2004-001608 A | 1/2004 |
| JP | 2005-170381 A | 6/2005 |
| JP | 2006-151029 A | 6/2006 |
| JP | 2011-235741 | * 11/2011 |

OTHER PUBLICATIONS

International Search Report, PCT/JP2011/053492, Apr. 19, 2011.

* cited by examiner

FIG. 7

| | Comparative example | Example |
|---|---|---|
| Structure of circumferential groove | 10° R3 ←8.4mm→ | 10° R3 R1.5 0.5mm ←8.4mm→ |
| Braking performance (of new tire) | 100 | 104 |
| Braking performance (of worn tire) | 100 | 103 |
| Noise performance | 100 | 100 |

US 9,221,304 B2

TIRE

CROSS REFERENCE TO RELATED APPLICATIONS

This application is a National Stage of International Application No. PCT/JP2011/053492 filed Feb. 18, 2011, claiming priority based on Japanese Patent Application No. 2010-033574 filed Feb. 18, 2010, the contents of all of which are incorporated herein by reference in their entirety.

TECHNICAL FIELD

The present invention relates to a tire provided with a plurality of rib-shaped land portions extending in the tire circumferential direction and formed with circumferential grooves extending in the tire circumferential direction.

BACKGROUND ART

Conventionally, in pneumatic tires (hereinafter, referred to as tires) mounted on passenger cars, for example, a method for forming a plurality of circumferential grooves in a tread has been widely used in order to ensure a water drainage performance on a wet road surface.

For example, there is known a tire provided at groove bottom portions of circumferential grooves thereof with projections inclined with respect to center lines of the circumferential grooves in a tread in order to facilitate the drainage of rainwater that has entered the circumferential grooves (for example, Patent Document 1). With such a tire, a water flow is generated in the rainwater that has entered the circumferential grooves, resulting in the improvement of a water drainage performance.

However, the above-mentioned conventional tire has the following problems. That is, the tire having groove bottom portions provided with projections has a problem that a buckling, that is, the tread is warped inward in the tire radial direction in the vicinity of the circumferential grooves, starting from the projections, easily occurs. If the buckling occurs, a ground contact shape of the tread is not stable, and as a result, braking performance is reduced.

Meanwhile, in order to suppress the occurrence of the buckling in the vicinity of the circumferential grooves, reinforcing the groove bottom portions of the circumferential grooves or wall surfaces of land portions forming the circumferential grooves is also considered. This case leads to another problem that the sectional area (volume) of the circumferential groove is reduced, resulting in the deterioration of a water drainage performance.

PRIOR ART DOCUMENT

Patent Document

Patent Document 1: Japanese Patent Application Publication No. 2005-170381 (Page 3, FIG. 2)

SUMMARY OF THE INVENTION

A tire (a pneumatic tire 1) according to the one characteristic comprising: a plurality of rib-shaped land portions (land portions 21, 22, 23, 24) which extend in a tire circumferential direction (a tire circumferential direction TC), and a circumferential groove (a circumferential groove 31, 32, 33) positioned between the land portions and extending in the tire circumferential direction. The circumferential groove is formed with an intra-groove groove (an intra-groove groove 310, 330) recessed farther inward in a tire radial direction than the circumferential groove with a groove bottom (a groove bottom 31a, 33a) of the circumferential groove being an upper end of the intra-groove groove. The intra-groove groove includes: a high-angle groove section (a high-angle groove section 311,331) in which an angle (an angle θ1) formed between a straight line (a straight line L1) perpendicular to a tire equator line (a tire equator line CL) and the intra-groove groove is equal to or more than a predetermined angle (i.e., 45-degree), and a low-angle groove section (312, 332) in which an angle (an angle θ2) formed between the straight line and the intra-groove groove is smaller than the predetermined angle, and which is continuous with the high-angle groove section. The high-angle groove section is positioned closer, than the low-angle groove section, to an intra-groove center line (an intra-groove center line DCL) passing through a center of a tread width direction of the circumferential groove. A width (a width W1) perpendicular to an extension direction of the high-angle groove section is wider than a width (a width W2) perpendicular to an extension direction of the low-angle groove section.

According to the above characteristics, in the circumferential groove, an intra-groove groove including a high-angle groove section and a low-angle groove section is formed. Accordingly, as compared with the case in which projections are provided in the circumferential grooves, the sectional area (volume) of the circumferential groove is increased, so it is possible to improve a water drainage performance.

Furthermore, an angle of the high-angle groove section is equal to or more than a predetermined angle. Furthermore, the high-angle groove section is positioned closer to an intra-groove center line than the low-angle groove section. Accordingly, the high-angle groove section is formed further along the tire circumferential direction than the low-angle groove section, the flow of rainwater entered the high-angle groove section is hardly disturbed, and this serves surely to improve a water drainage performance.

In particular, a width of the high-angle groove section is wider than a width of the low-angle groove section, and as such the sectional area (volume) of the circumferential groove is increased and water flow in the tire circumferential direction easily occurs in the rainwater entered the high-angle groove section, and this serves more surely to improve a water drainage performance.

Meanwhile, an angle of the low-angle groove section is smaller than the predetermined angle. Furthermore, the low-angle groove section is positioned closer to the land portion than the high-angle groove section. Accordingly, as compared with the case in which an angle θ1 is equal to or more than the predetermined angle, it is possible to reliably ensure the rigidity of the land portion. Thus, in the vicinity of the circumferential grooves, it is possible to suppress the occurrence of buckling, that is, the tread is warped inward in the tire radial direction. Consequently, the ground contact shape of the tread is stable, so that it is possible to suppress the deterioration of braking performance.

In the one characteristic, the high-angle groove section extends along the tire circumferential direction, and the low-angle groove section extends along a tread width direction.

In the one characteristic, each of the low-angle groove sections is provided at both ends of the high-angle groove section.

In the one characteristic, the low-angle groove section is connected to the land portion.

In the one characteristic, the land portion includes an outer land portion (an land portion 21, 24) positioned outward in the tread width direction of the circumferential groove, and the outer land portion is formed with a small hole (a small hole 211, 241) recessed farther inward in the tire radial direction than a tread contact surface.

In the one characteristic, the small hole is positioned between low-angle groove sections adjacent to each other in the tire circumferential direction.

BRIEF DESCRIPTION OF THE DRAWINGS

FIG. 7 is table showing the evaluation results of a vehicle mounted with example pneumatic tires.

MODES FOR CARRYING OUT THE INVENTION

Figure 1:
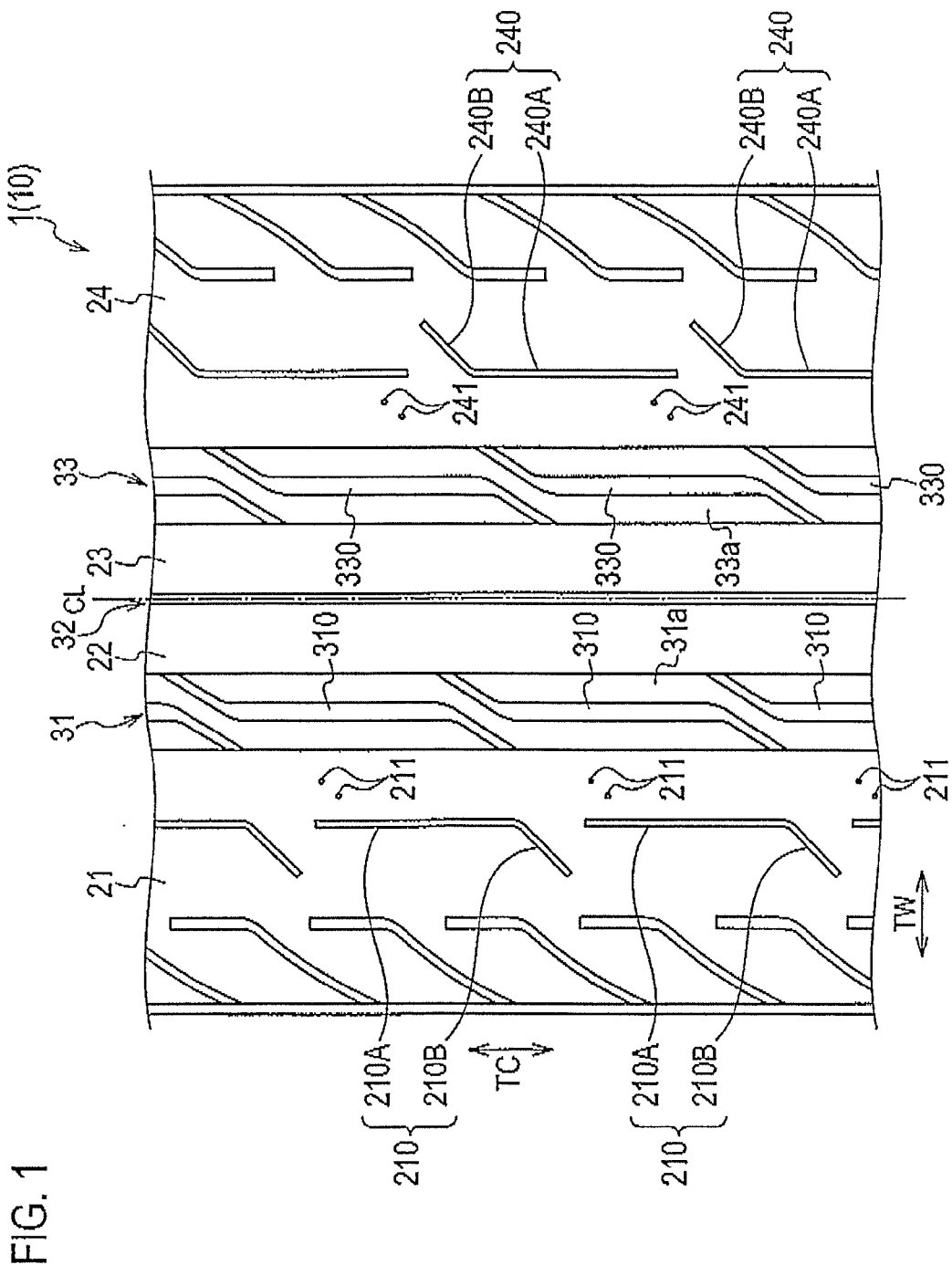
FIG. 1 is a development view illustrating a part of a tread contact surface 10 of a pneumatic tire 1 according to the present embodiment.

Next, an embodiment of a pneumatic tire according to the present invention is explained with reference to drawings. Specifically, (1) Overall configuration of pneumatic tire, (2) Configuration of circumferential groove, (3) Configuration of small hole, (4) Modifications, (5) Comparative evaluations, (6) Operation and effect, and (7) Other embodiments will be explained.

In the following description of the drawings, the same or similar reference numerals are used to designate the same or similar parts. It will be appreciated that the drawings are schematically shown and the ratio and the like of each dimension are different from the real ones.

Therefore, detailed dimension and the like should be determined considering the following description. Of course, among the drawings, the dimensional relationship and the ratio may be different.

(1) Overall Configuration of Pneumatic Tire

Figure 2:
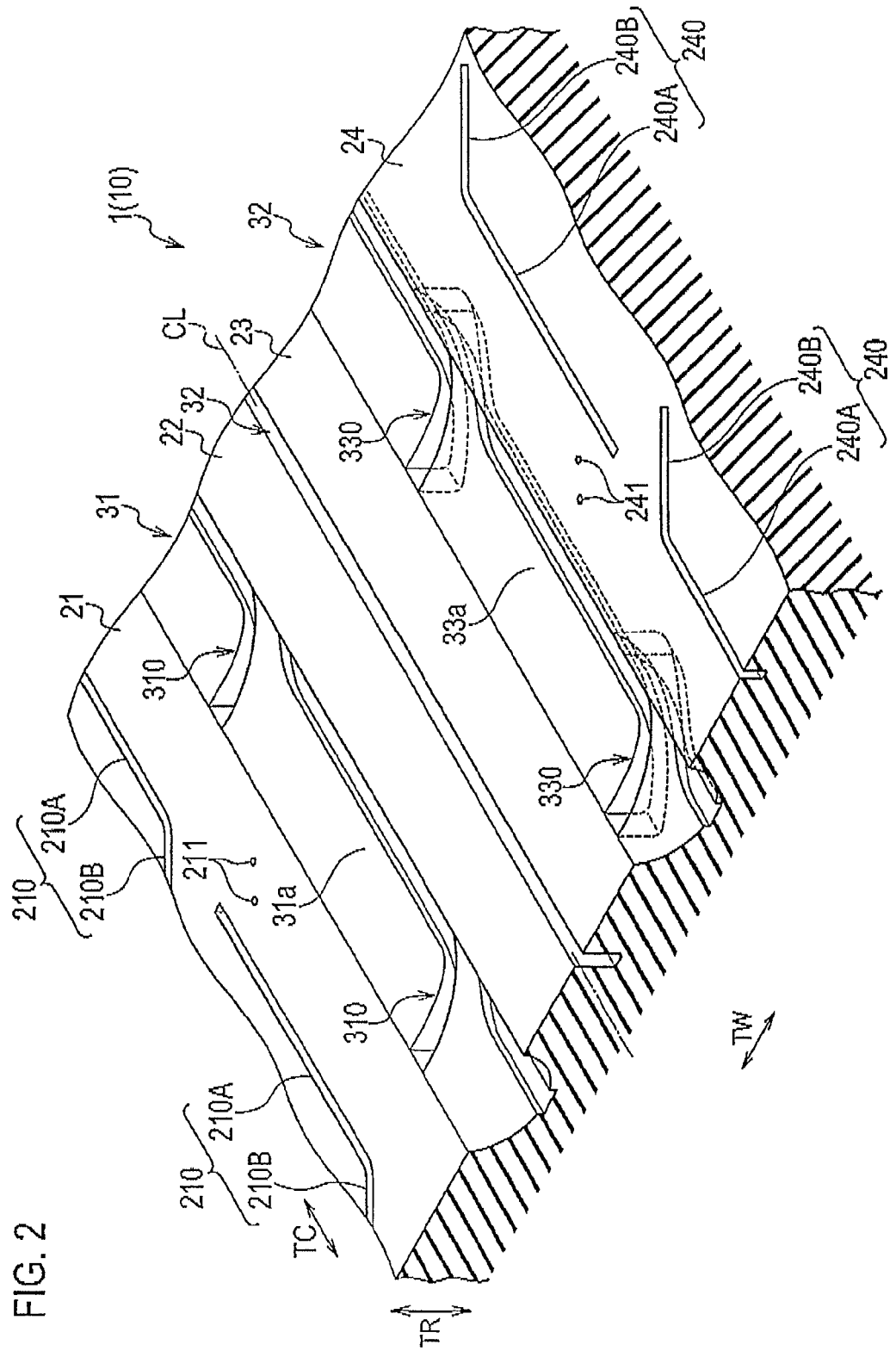
FIG. 2 is a perspective view illustrating a part of the tread contact surface 10 of the pneumatic tire 1 according to the present embodiment.

First, the overall configuration of a pneumatic tire 1 according to the present embodiment will be explained with reference to drawings. FIG. 1 is a development view illustrating a part of a tread contact surface 10 of the pneumatic tire 1 according to the present embodiment. FIG. 2 is a perspective view illustrating a part of the tread contact surface 10 of the pneumatic tire 1 according to the present embodiment. Furthermore, the pneumatic tire 1 may be filled with, other than air, an inert gas such as nitrogen gas.

As illustrated in FIG. 1 and FIG. 2, tread patterns formed on the tread contact surface 10 of the pneumatic tire 1 are asymmetrical to each other with respect to a tire equator line CL that passes through the center of the pneumatic tire 1. The pneumatic tire 1 is provided with a plurality of rib-shaped land portions extending in the tire circumferential direction TC. Furthermore, the pneumatic tire 1 is formed on the tread contact surface 10 thereof with circumferential grooves positioned between the land portions and extending in the tire circumferential direction TC.

Specifically, the land portion includes a land portion 21, a land portion 22, a land portion 23, and a land portion 24 from the left side to the right side of FIG. 1. The land portion 21 configures an outer land portion positioned outward in the tread width direction TW of a circumferential groove 31 which will be explained later. The land portion 21 is formed with at least a plurality of auxiliary grooves 210 and a plurality of small holes 211 (pin sipes). In addition, the configuration of the small hole 211 will be explained later.

Each auxiliary groove 210 includes a circumferential groove section 210A extending along the tire circumferential direction TC and a width direction groove section 210B extending along the tread width direction TW. The circumferential groove section 210A is positioned closer to the tire equator line CL (the circumferential groove 31 which will be explained later) than the width direction groove section 210B. The width direction groove section 210B extends outward in the tread width direction TW from one end (a lower end in FIG. 1) of the circumferential groove section 210A.

The land portion 22 and the land portion 23 are not formed with grooves and recesses and extend in the tire circumferential direction. The land portion 22 and the land portion 23 are positioned inward in the tread width direction TW of the circumferential grooves 31 and 33 which will be explained later.

The land portion 24 configures an outer land portion positioned outward in the tread width direction TW of the circumferential groove 33 which will be explained later. Similarly to the land portion 21, the land portion 24 is formed with at least a plurality of auxiliary grooves 240 and a plurality of small holes 241 (pin sipes). In addition, the configuration of the small hole 241 will be explained later.

Each auxiliary groove 240 includes a circumferential groove section 240A extending along the tire circumferential direction TC and a width direction groove section 240B extending along the tread width direction TW. The circumferential groove section 240A is positioned closer to the tire equator line CL (the circumferential groove 33 which will be explained later) than the width direction groove section 240B. The width direction groove section 240B extends outward in the tread width direction TW from one end (an upper end in FIG. 1) of the circumferential groove section 240A.

The circumferential groove is comprised of the circumferential groove 31, a circumferential groove 32, and the circumferential groove 33 from the left side till the right side of FIG. 1. The circumferential grooves 31 and 33 have a semilunar shape recessed in the tire radial direction TR in the cross-section taken along line A-A (see FIG. 2 and FIG. 4). In addition, the configuration of the circumferential grooves 31 and 33 will be explained later.

Meanwhile, the circumferential groove 32 is positioned on the tire equator line CL and is formed to be thinner than the circumferential grooves 31 and 33. The circumferential groove 32 has a rectangular shape recessed in the tire radial direction TR in the cross-section taken along line A-A (see FIG. 2 and FIG. 4).

(2) Configuration of Circumferential Groove

Figure 3:
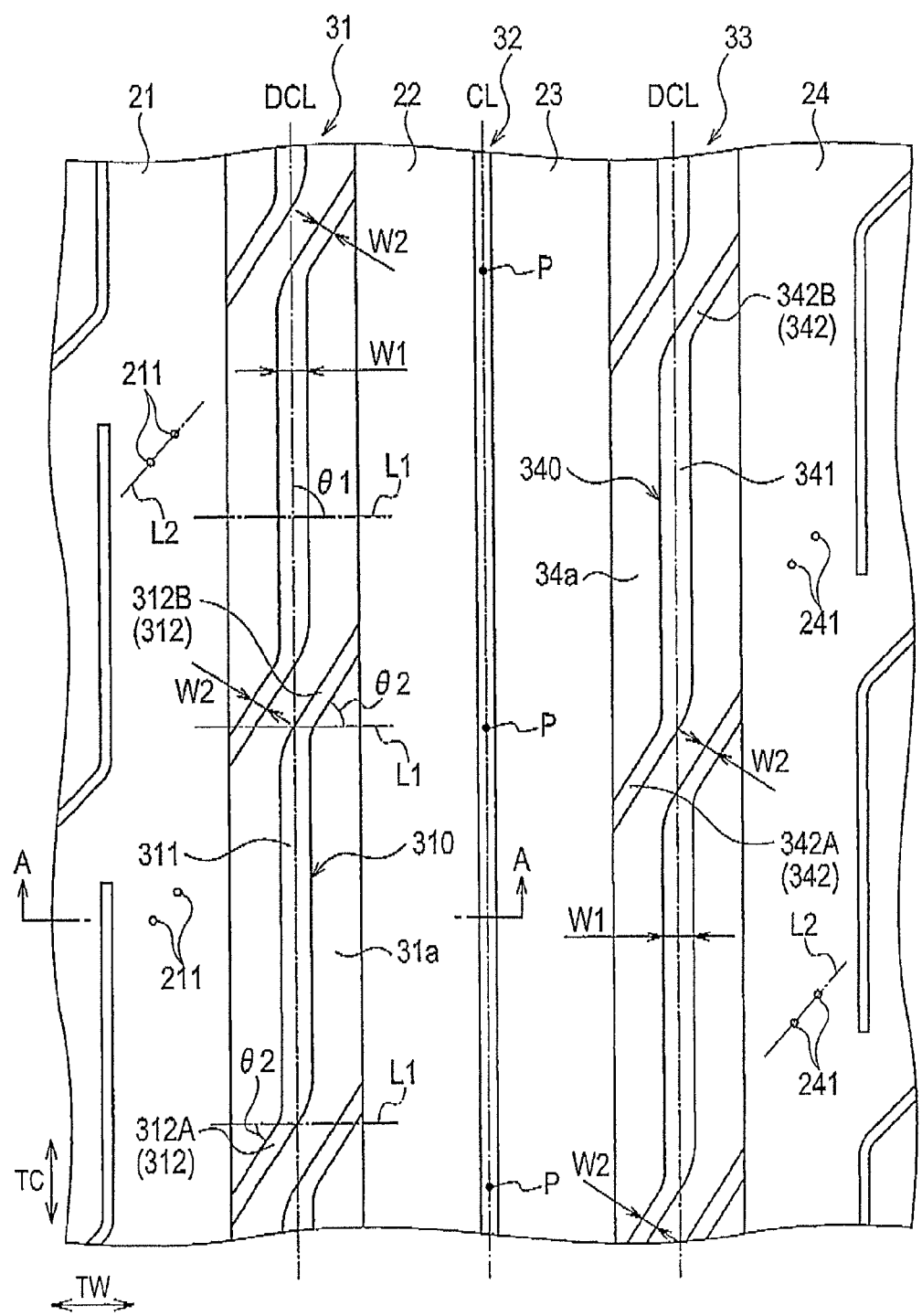
FIG. 3 is an expanded plan view illustrating the application vicinity of circumferential grooves 31 and 33 according to the present embodiment.
Figure 4:
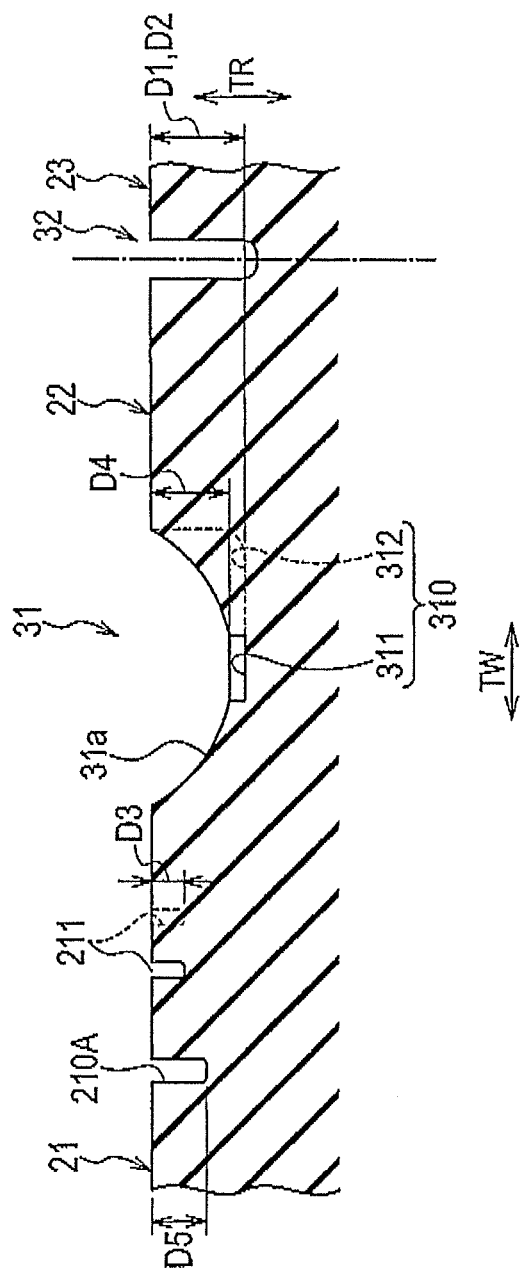
FIG. 4 is a cross-sectional view (a cross-sectional view taken along line A-A of FIG. 3) illustrating a part of the circumferential groove 31 according to the present embodiment.

Subsequently, the configuration of the above-mentioned circumferential grooves 31 and 33 will be explained with reference to FIG. 1 to FIG. 4. FIG. 3 is an expanded plan view illustrating the vicinity of the circumferential grooves 31 and 33 according to the present embodiment. FIG. 4 is a cross-sectional view (a cross-sectional view taken along line A-A of FIG. 3) illustrating a part of the circumferential groove 31 according to the present embodiment. In addition, the configuration of the circumferential groove 31 is the same as the configuration of the circumferential groove 33, and therefore, FIG. 4 illustrates only the configuration of the circumferential groove 31.

As illustrated in FIG. 1 to FIG. 4, the circumferential groove 31 is formed with an intra-groove groove 310 which is recessed farther inward in the tire radial direction TR than the circumferential groove 31 with a groove bottom 31a of the circumferential groove 31 being an upper end of the intra-groove groove 310. In view of a tread contact surface, the intra-groove groove 310 is provided in a crank shape (an S shape). Specifically, the intra-groove groove 310 includes a high-angle groove section 311 and a low-angle groove section 312.

As illustrated in FIG. 3, the high-angle groove section 311 extends in linear fashion along the tire circumferential direction TC, and is continuous with the low-angle groove section 312. In relation to the high-angle groove section 311, an angle θ1 formed between a straight line L1 perpendicular to the tire equator line CL and the intra-groove groove 310 is equal to or more than a predetermined angle (for example, 45°). In the present embodiment, the angle θ1 of the high-angle groove section 311 is 90°.

The high-angle groove section 311 is positioned closer, than the low-angle groove section 312, to an intra-groove center line DCL that passes through the center of the tread width direction TW of the circumferential groove 31. In the present embodiment, the high-angle groove section 311 is positioned on the intra-groove center line DCL.

Furthermore, a width W1 perpendicular to an extension direction (the tire circumferential direction TC) of the high-angle groove section 311, that is, a width along the tread width direction TW is approximately constant. The width W1 of the high-angle groove section 311 is wider than a width W2 along an extension direction of the low-angle groove section 312 which will be explained later.

The low-angle groove section 312 extends along the tread width direction TW, and is connected to a land portion (the land portion 21 or the land portion 22). In relation to the low-angle groove section 312, an angle θ2 formed between the straight line L1 and the intra-groove groove 310 is smaller than the predetermined angle. In the present embodiment, the angle θ2 of the low-angle groove section 312 is 40°.

The low-angle groove section 312 is positioned closer to the land portion than the high-angle groove section 311. The low-angle groove section 312 is provided respectively at both ends of the high-angle groove section 311.

Specifically, the low-angle groove section 312 includes a first groove section 312A provided at one end (a lower end in FIG. 3) of the high-angle groove section 311, and a second groove section 312B provided at the other end (an upper end in FIG. 3) of the high-angle groove section 311. The first groove section 312A is connected to the land portion 21 and the second groove section 312B is connected to the land portion 22. The first groove section 312A and the second groove section 312B are provided in parallel to each other.

As illustrated in FIG. 4, a depth D1 along the tire radial direction TR from the tread contact surface 10 of the pneumatic tire 1 to the groove bottom of the high-angle groove section 311 is approximately the same as a depth D2 along the tire radial direction TR from the tread contact surface 10 of the pneumatic tire 1 to the groove bottom of the low-angle groove section 312.

Meanwhile, the circumferential groove 33 is formed with an intra-groove groove 330 which is recessed farther inward in the tire radial direction TR than the circumferential groove 33 with a groove bottom 33a of the circumferential groove 33 being an upper end of the intra-groove groove 330. In addition, the configuration of the intra-groove groove 330 is approximately the same as the configuration of the above-mentioned intra-groove groove 310, and therefore, the description will be made by focusing on the differences.

The intra-groove groove 330 includes a high-angle groove section 331 and a low-angle groove section 332. The low-angle groove section 332 includes a first groove portion 332A provided at one end (a lower end in FIG. 3) of the high-angle groove section 331, and a second groove portion 332B provided at the other end (an upper end in FIG. 3) of the high-angle groove section 331. The first groove portion 332A is connected to the land portion 23 and the second groove portion 332B is connected to the land portion 24.

The intra-groove grooves 310 and 330 as explained above are point-symmetrical to each other with respect to a center point P on the tire equator line CL (see FIG. 3).

(3) Configuration of Small Hole

Subsequently, the configuration of the above-mentioned small holes 211 and 241 will be explained with reference to FIG. 1 to FIG. 4. As illustrated in FIG. 1 to FIG. 3, the small holes 211 and 241 are arranged in a row on a straight line L2 (see FIG. 3) parallel to the extension directions of the low-angle groove sections 312 and 332, respectively, wherein the number of the arranged small holes 211 is two and the number of the arranged small holes 241 is two. In view of the tread contact surface, the small holes 211 and 241 are formed to have a circular shape.

As illustrated in FIG. 4, the small holes 211 and 241 are recessed farther inward in the tire radial direction TR than the tread contact surface 10A. Depths D3 along the tire radial direction TR of the small holes 211 and 241 are shallower than a depth D4 along the tire radial direction TR of the circumferential groove. Furthermore, the depths D3 of the small holes 211 and 241 are shallower than depths D5 along the tire radial direction TR of the auxiliary grooves 210 and 240.

The small hole 211 is provided at the side of one end (an upper end in FIG. 4) of the circumferential groove section 210A, that is, at the side of the other end of the circumferential groove section 210A to which the width direction groove section 210B is continuous. Specifically, the small hole 211 is positioned between the low-angle groove sections 312 adjacent to each other in the tire circumferential direction TC. That is to say, the small hole 211 is positioned between the first groove portions 312A adjacent to each other in the tire circumferential direction TC.

Meanwhile, the small hole 241 is provided at the side of one end (a lower end in FIG. 4) of the circumferential groove section 240A, that is, at the side of the other end of the circumferential groove section 240A to which the width direction groove section 240B is continuous. Specifically, the small hole 241 is positioned between the low-angle groove sections 332 adjacent to each other in the tire circumferential direction TC. That is to say, the small hole 241 is positioned between the second groove portions 332B adjacent to each other in the tire circumferential direction TC.

(4) Modifications

Subsequently, modifications of the tread contact surface 10 of the pneumatic tire 1 according to the above-mentioned embodiment will be explained with reference to drawings. In addition, to portions identical to the tread contact surface 10 of the pneumatic tire 1 according to the above-mentioned embodiment, identical numerals are assigned, and the description will be made by focusing on the differences.

(4-1) First Modification

Figure 5:
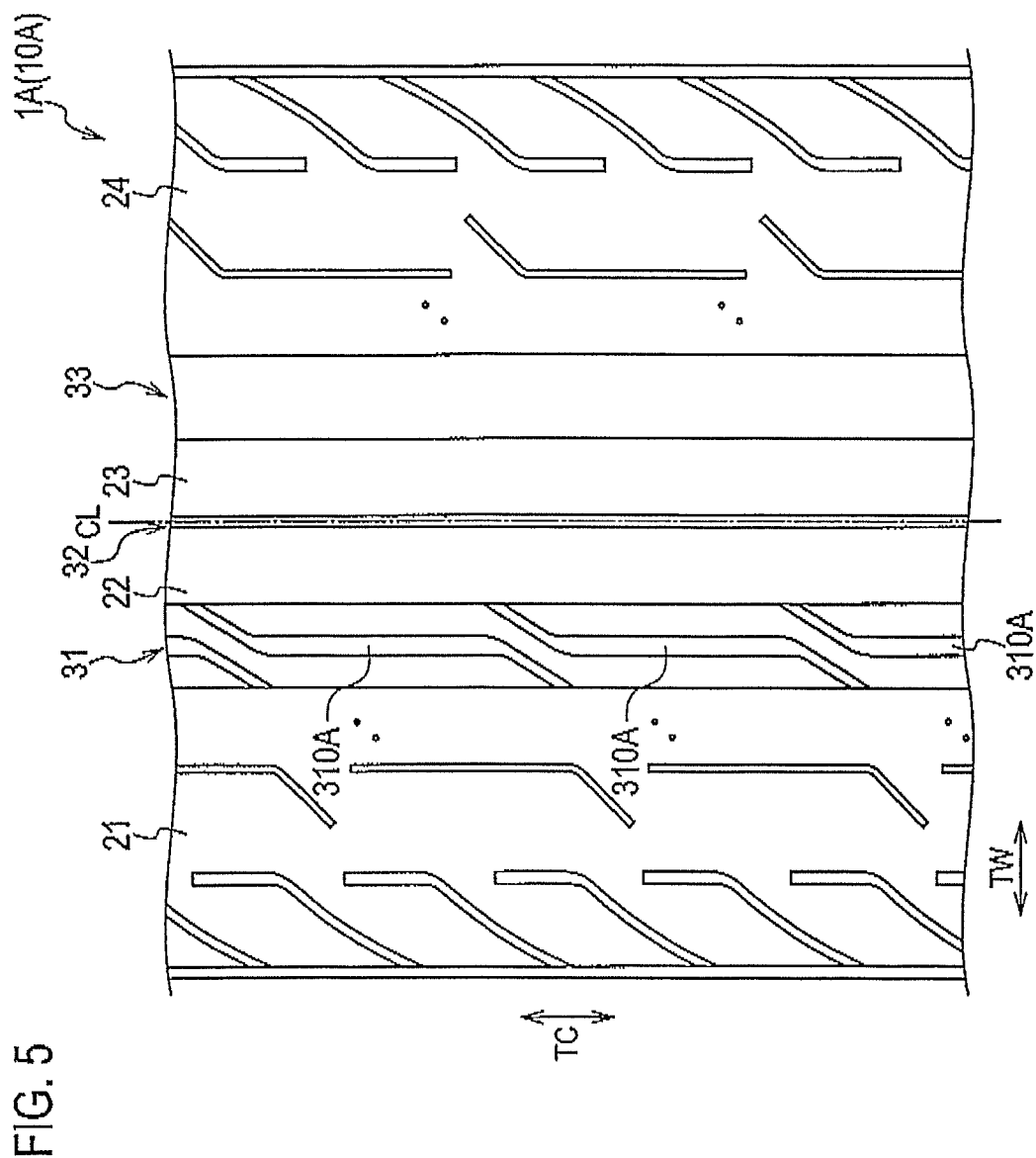
FIG. 5 is a development view illustrating a part of a tread contact surface 10A of a pneumatic tire 1A according to a first modification.

First, the configuration of a tread contact surface 10A of a pneumatic tire 1A according to a first modification will be explained with reference to the drawing. FIG. 5 is a development view illustrating a part of the tread contact surface 10A of the pneumatic tire 1A according to the first modification.

In the above-mentioned embodiment, the intra-groove groove 310 is provided in the two circumferential grooves (the circumferential grooves 31 and 33). On the other hand, in the first modification, as illustrated in FIG. 5, an intra-groove groove 310A is provided in one circumferential groove.

Specifically, the intra-groove groove 310A is provided in only the circumferential groove 31 positioned at the most left side with respect to the tire equator line CL. In addition, the intra-groove groove 310A needs not always be provided in only the circumferential groove 31 positioned at the most left side with respect to the tire equator line CL. For example, the intra-groove groove 310A may be provided in only the circumferential groove 32 on the tire equator line CL, or only the circumferential groove 33 positioned at the most right side with respect to the tire equator line CL.

Here, the number of circumferential grooves or the configuration (the shape, the number and the like) of auxiliary grooves is not limited to the above-mentioned embodiment, and it is of course that it can be properly selected according to the purposes.

(4-2) Second Modification

Figure 6:
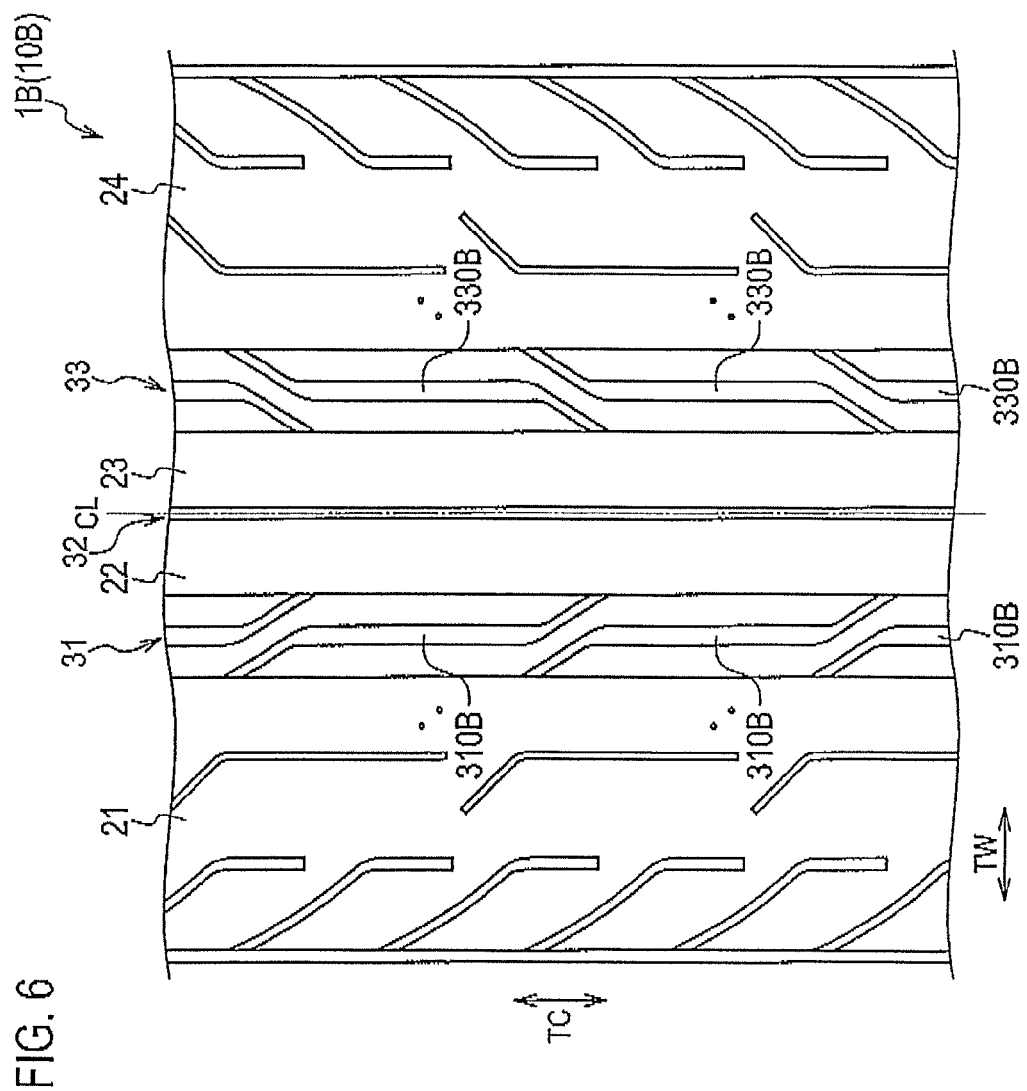
FIG. 6 is a development view illustrating a part of a 10 tread contact surface 10B of a pneumatic tire 1B according to a second modification.

Subsequently, the configuration of a tread contact surface 10B of a pneumatic tire 1B according to a second modification will be explained with reference to the drawing. FIG. 6 is a development view illustrating a part of the tread contact surface 10B of the pneumatic tire 1B according to the second modification.

In the above-mentioned embodiment, the tread patterns of the pneumatic tire 1 are asymmetrical to each other about the tire equator line CL. That is, the intra-groove grooves 310 and 330 are point-symmetrical to each other with respect to the center point P.

On the other hand, in the second modification, as illustrated in FIG. 6, the tread patterns of the pneumatic tire 1B are symmetrical to each other with respect to the tire equator line CL. That is, intra-groove grooves 310B and 330B are line-symmetrical to each other with respect to the tire equator line CL.

(5) Comparative Evaluations

Subsequently, in order to further clarify the effect of the present invention, a comparative evaluation will be described in which pneumatic tires according to a comparative example and an example below were used. Specifically, (5.1) Configuration of each pneumatic tire and (5.2) Evaluation results will be explained. It is noted that the present invention is not limited to these examples in any way.

(5.1) Configuration of each Pneumatic Tire

First, the pneumatic tires according to the example and the comparative example will be briefly explained. Data items relating to the pneumatic tire were measured under the following condition:
Size of Tires: 225/45R17
Size of Rims: 7J-17
Vehicle Condition: Japanese FF Car (2000 cc displacement)
Internal Pressure Condition: Proper Internal Pressure
Load Condition: Load of Driver+600 N In the pneumatic tires according to the comparative example, the intra-groove grooves 310 and 330 explained in the embodiment are not formed in the circumferential grooves. Furthermore, in the pneumatic tires according to the comparative example, the small holes 211 and 241 explained in the embodiment are not formed in the land portions.

Meanwhile, in the pneumatic tire according to the example, the intra-groove grooves 310 and 330 explained, in the embodiment are formed in the circumferential groove 31 and the circumferential groove 33, respectively (see FIG. 1 to FIG. 4). Furthermore, in the pneumatic tire according to the example, the small holes 211 and 241 explained in the embodiment are formed in the land portions. In addition, the pneumatic tires according to the comparative example and the example are same except for the configuration of the circumferential groove.

(5.2) Evaluation Results

Subsequently, evaluation results (braking performance and noise performance) of a vehicle mounted with each pneumatic tire will be explained with reference to Table 1 in FIG. 7.

(5.2.1) Braking Performance of New Tire

In relation to braking performance of a new tire, in a test course with a water depth of 2 mm, when a distance (deceleration) until a vehicle mounted with the pneumatic tires according to the comparative example stops by full braking from a speed of 60 km/h was set to '100', deceleration of a vehicle mounted with the pneumatic tires according to the example underwent a felling evaluation by a professional driver. In addition, the greater the value of the index, the superior the braking performance.

As a consequence, as illustrated in Table 1 in FIG. 7, the vehicle mounted with the pneumatic tires according to the example has a good water drainage performance as compared with the vehicle mounted with the pneumatic tires according to the comparative example, and thus, the braking performance of the new tire was determined to be excellent.

(5.2.2) Braking Performance of Worn Tire

In relation to braking performance of a worn tire (worn by 50%), similarly to the test of the braking performance of the new tire, when the deceleration of the vehicle mounted with the pneumatic tires according to the comparative example was set to '100', the deceleration of the vehicle mounted with the pneumatic tires according to the example underwent the feeling evaluation by the professional driver. In addition, the greater the value of the index, the superior the braking performance.

As a consequence, as illustrated in Table 1 in FIG. 7, the vehicle mounted with the pneumatic tires according to the example has a good water drainage performance as compared with the vehicle mounted with the pneumatic tires according to the comparative example, and thus, the braking performance of the worn tire was determined to be excellent.

(5.2.3) Noise Performance

In relation to noise performance, when noise (pattern noise) at the time of driving of the vehicle mounted with the pneumatic tires according to the comparative example was set to '100', an index of noise of the vehicle mounted with the pneumatic tires according to the example was produced. In addition, the smaller the value of the index, the smaller the noise.

As a consequence, as illustrated in Table 1 in FIG. 7, it was determined that the vehicle mounted with the pneumatic tires according to the example can reduce noise, as compared with the vehicle mounted with the pneumatic tires according to the comparative example.

(6) Operation and Effect

In the above-mentioned embodiment, the circumferential grooves 31 and 33 are formed with the intra-groove grooves 310 and 330 including the high-angle groove sections 311 and 331 and the low-angle groove sections 312 and 332, respectively. Accordingly, as compared with the case in which the circumferential grooves 31 and 33 are provided with projections, the sectional areas (volume) of the circumferential grooves 31 and 33 are increased, so that it is possible to improve a water drainage performance.

Furthermore, in relation to the high-angle groove sections 311 and 331, the angle θ1 between the straight line L1 and the intra-groove grooves 310 and 330 is equal to or more than the predetermined angle. Furthermore, the high-angle groove sections 311 and 331 are positioned closer to the intra-groove center line DCL than the low-angle groove sections 312 and 332, respectively. Accordingly, the high-angle groove sections 311 and 331 are formed further along the tire circumferential direction TC than the low-angle groove sections 312 and 332, and therefore, the flow of rainwater entered the high-angle groove sections 311 and 331 is hardly disturbed, and this serves surely to improve a water drainage performance.

In particular, the widths W1 of the high-angle groove sections 311 and 331 are wider than the widths W2 of the low-angle groove sections 312 and 332, so that the sectional areas (volume) of the circumferential grooves 31 and 33 are increased and water flow in the tire circumferential direction TC easily occurs in the rainwater entered the high-angle groove sections 311 and 331, and this serves more surely to improve a water drainage performance.

Meanwhile, in relation to the low-angle groove sections 312 and 332, the angle θ1 between the straight line L1 and the intra-groove grooves 310 and 330 is smaller than the predetermined angle. Furthermore, the low-angle groove sections 312 and 332 are positioned closer to the land portions than the high-angle groove sections 311 and 331, respectively. Accordingly, as compared with the case in which an angle θ1 is equal to or more than the predetermined angle, it is possible to reliably ensure the rigidity of the land portion. Thus, in the vicinity of the circumferential grooves 31 and 33, it is possible to suppress the occurrence of buckling, that is, a phenomenon that the tread is warped inward in the tire radial direction TR. Consequently, the ground contact shape of the tread is stable, so that it is possible to suppress the deterioration of braking performance.

In the embodiment, the high-angle groove sections 311 and 331 extend along the tire circumferential direction TC. Accordingly, the flow of water in the circumferential grooves 31 and 33 is further stable, and this serves more surely to improve a water drainage performance.

Furthermore, the low-angle groove sections 312 and 332 extend along the tread width direction TW. Accordingly, the rigidity in the tread width direction TW on the wall surfaces of the land portions forming the circumferential grooves 31 and 33 is improved, so that it is possible to more surely ensure the rigidity of the land portions.

In the embodiment, the low-angle groove sections 312 and 332 are provided at both ends of the high-angle groove sections 311 and 331, respectively. Accordingly, at the time of wear of a tire, edge effects are increased by the first groove section 312A and the second groove section 312B, resulting in the improvement of braking performance at the time of the wear of the tire.

In the embodiment, the low-angle groove sections 312 and 332 are connected to the land portions, respectively. Accordingly, at the initial stage of wear of a tire, it is possible to obtain edge effects by the low-angle groove sections 312 and 332, resulting in the improvement of braking performance.

In the embodiment, the land portions 21 and 24 are formed with the small holes 211 and 241, respectively. Accordingly, when a tire is new, it is possible to obtain edge effects by the small holes 211 and 241 while suppressing the deterioration of the rigidity of the land portions 21 and 24, and this serves surely to improve a braking performance.

Meanwhile, when the land portions 21 and 24 are not formed with the small holes 211 and 241, the rigidity between the first groove portions 312A in the land portions 21 and 24 may be increased, so that the rigidity in the tire circumferential direction TC of the land portions 21 and 24 may not be uniform. Therefore, noise (so-called "pattern noise") produced as a result of the tread of the pneumatic tire 1 contacting the ground is considered to be easily generated.

However, the small holes 211 and 241 are positioned between the low-angle groove sections 312 and 332 adjacent in the tire circumferential direction TC, respectively. Accordingly, variation does not easily occur in the rigidity in the tire circumferential direction TC of the land portions 21 and 24, so that it is possible to suppress the generation of noise produced as a result of the tread of the pneumatic tire 1 contacting the ground.

In the embodiment, the circumferential grooves 31 and 33 have a semilunar shape recessed in the tire radial direction TR in the cross-section taken along line A-A. Accordingly, with the tire being worn out, the rigidity of the land portions is increased, and edge effects by the low-angle groove sections 312 and 332 can be gradually demonstrated. Consequently, it is possible to achieve more stable braking performance from the initial stage of wear to a predetermined amount of wear.

(7) Other Embodiments

So far, the present invention is disclosed through the above embodiments. However, it should not be interpreted that the statements and drawings constituting a part of the present disclosure limit the present invention. From the present disclosure, various alternative embodiments, examples, and operational technologies will become apparent to those skilled in the art.

For example, the embodiment of the present invention can be modified as follows. Specifically, as the tire, although the pneumatic tire 1 filled with air or nitrogen gas is explained, this is not a limitation, and may be a solid tire that is not filled with air or nitrogen gas.

Furthermore, it is sufficient if the pneumatic tire 1 is provided with at least the land portions and the circumferential grooves. It is of course that the tread pattern of the pneumatic tire 1 can be properly selected according to the purposes.

Furthermore, although the high-angle groove sections 311 and 331 and the low-angle groove sections 312 and 332 formed in a linear shape are explained, this is not a limitation, and for example, may be formed in a curved shape.

Furthermore, although the low-angle groove sections 312 and 332 provided at both ends of the high-angle groove sections 311 and 331, respectively, are explained, this is not a limitation, and may be provided at one end of any one thereof, or provided at a part (for example, around the center) other than the ends thereof.

Furthermore, although the first groove section 312A and the second groove section 312B (the first groove portion 332A and the second groove portion 332B) respectively connecting to different land portions are explained, this is not a limitation, and may continue with the same land portion. In addition, the low-angle groove sections 312 and 332 need not always be connected to the land portions, and may be terminated in the circumferential grooves 31 and 33, respectively.

Furthermore, the description has been provided that the depth D1 along the tire radial direction TR from the tread contact surface 10 of the pneumatic tire 1 to the groove bottom of the high-angle groove section 311 is approximately the same as the depth D2 along the tire radial direction TR from the tread contact surface 10 of the pneumatic tire 1 to the groove bottom of the low-angle groove section 312 is explained; however, this is not a limitation. For example, in order to improve a water drainage performance in the vicinity of the intra-groove center line DCL or the rigidity of the land portions, the depth D1 may be deeper than the depth D2, that is, the depth D2 may be shallower than the depth D1.

Furthermore, the configuration (the number, shape and the like) of the small holes 211 and 241 is not limited to the embodiment explained above, and it is of course that it can be properly selected according to the purposes. For example, although the small holes 211 and 241 formed in a circular shape in view of the tread contact surface are explained, this is not a limitation, and may be formed in a triangular shape or a rectangular shape (a polygonal shape). In addition, the small holes 211 and 241 need not always be formed in the land portions 21 and 24, respectively, and may not be formed in the land portions 21 and 24.

As mentioned above, it is of course that the present invention includes various embodiments and the like not described here. Therefore, the technical range of the present invention is to be defined only by the inventive specific matter according to the adequate claims from the above description.

The entire contents of Japanese Patent Application No. 2010-033574 (filed on Feb. 18, 2010) are incorporated in the present specification by reference.

INDUSTRIAL APPLICABILITY

According to the characteristics of the present invention, when a tread is formed with circumferential grooves, it is possible to provide a tire capable of suppressing the deterioration of braking performance due to buckling while improving a water drainage performance.

The invention claimed is:

1. A tire comprising: a plurality of rib-shaped land portions which extend in a tire circumferential direction; and
a circumferential groove positioned between the land portions and extending in the tire circumferential direction, wherein
the circumferential groove is formed with an intra-groove groove recessed farther inward in a tire radial direction than the circumferential groove with a groove bottom of the circumferential groove being an upper end of the intra-groove groove, the intra-groove groove includes:
a high-angle groove section in which an angle formed between a straight line perpendicular to a tire equator line and the intra-groove groove is equal to or more than a predetermined angle, and
a low-angle groove section in which an angle formed between the straight line and the intra-groove groove is smaller than the predetermined angle, and which is continuous with the high-angle groove section,
the high-angle groove section is positioned closer, than the low-angle groove section, to an intra-groove center line passing through a center of a tread width direction of the circumferential groove, and
a width perpendicular to an extension direction of the high-angle groove section is wider than a width perpendicular to an extension direction of the low-angle groove section,
wherein the low-angle groove section is provided at both ends of the high-angle groove section.

2. The tire according to claim 1, wherein
the high-angle groove section extends along the tire circumferential direction, and
the low-angle groove section extends along a tread width direction.

3. The tire according to claim 1, wherein the low-angle groove section is connected to the land portion.

4. The tire according to claim 1, wherein
the land portion includes an outer land portion positioned outward in the tread width direction of the circumferential groove, and
the outer land portion is formed with a small hole recessed farther inward in the tire radial direction than a tread contact surface.

5. The tire according to claim 4, wherein the small hole is positioned between low-angle groove sections adjacent to each other in the tire circumferential direction.

* * * * *